(12) United States Patent
Jiao et al.

(10) Patent No.: US 8,022,958 B2
(45) Date of Patent: Sep. 20, 2011

(54) INDEXES OF GRAPHICS PROCESSING OBJECTS IN GRAPHICS PROCESSING UNIT COMMANDS

(75) Inventors: Guofang Jiao, San Diego, CA (US); Lingjun Chen, San Diego, CA (US); Yun Du, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1015 days.

(21) Appl. No.: 11/696,665

(22) Filed: Apr. 4, 2007

(65) Prior Publication Data

US 2008/0246773 A1  Oct. 9, 2008

(51) Int. Cl.
- G06T 15/00 (2011.01)
- G06T 15/50 (2011.01)
- G09G 5/36 (2006.01)

(52) U.S. Cl. .......... 345/522; 345/426; 345/557

(58) Field of Classification Search ........ 345/426, 345/501, 502, 506, 522, 530, 544, 557, 559
See application file for complete search history.

(56) References Cited

U.S. PATENT DOCUMENTS

| | | | | |
|---|---|---|---|---|
| 5,920,326 | A * | 7/1999 | Rentschler et al. | 345/503 |
| 6,404,428 | B1 * | 6/2002 | Radecki et al. | 345/419 |
| 6,489,963 | B2 | 12/2002 | Parikh et al. | |
| 6,972,769 | B1 | 12/2005 | Nebeker et al. | |
| 7,038,692 | B1 | 5/2006 | Priem et al. | |
| 7,196,710 | B1 | 3/2007 | Fouladi et al. | |
| 7,245,302 | B1 | 7/2007 | Donham et al. | |
| 7,598,958 | B1 * | 10/2009 | Kelleher | 345/504 |
| 2002/0060684 | A1 * | 5/2002 | Alcorn et al. | 345/552 |
| 2002/0118204 | A1 * | 8/2002 | Aleksic et al. | 345/544 |
| 2007/0146378 | A1 * | 6/2007 | Sorgard et al. | 345/581 |
| 2008/0024495 | A1 * | 1/2008 | Mech et al. | 345/426 |

FOREIGN PATENT DOCUMENTS

| | | |
|---|---|---|
| EP | 0627700 | 12/1994 |
| EP | 1096427 | 5/2001 |

OTHER PUBLICATIONS

International Search Report—PCT/US08/059463—International Search Authority, European Patent Office—Aug. 26, 2008.
Written Opinion—PCT/US08/059463—International Search Authority, European Patent Office—Aug. 26, 2008.
Jordi Roca, et al., "Workload Characterization of 3D Games," Workload Characterization, 2006 IEEE International Symposium on, IEEE, PI, Oct. 1, 2006, pp. 17-26.

* cited by examiner

*Primary Examiner* — Joni Hsu
(74) *Attorney, Agent, or Firm* — Matthew J. Evans; James R. Gambale, Jr.

(57) ABSTRACT

This disclosure describes techniques of loading batch commands into a graphics processing unit (GPU). As described herein, a GPU driver for the GPU identifies one or more graphics processing objects to be used by the GPU in order to render a batch of graphics primitives. The GPU driver may insert indexes associated with the identified graphics processing objects into a batch command. The GPU driver may then issue the batch command to the GPU. The GPU may use the indexes in the batch command to retrieve the graphics processing objects from memory. After retrieving the graphics processing objects from memory, the GPU may use the graphics processing objects to render the batch of graphics primitives.

49 Claims, 4 Drawing Sheets

INDEXES OF GRAPHICS PROCESSING OBJECTS IN GRAPHICS PROCESSING UNIT COMMANDS

TECHNICAL FIELD

The invention relates to computer graphics processing, and, more particularly, to graphics processing units.

BACKGROUND

A graphics processing unit (GPU) is a specialized electronic device that is specifically designed to perform operations related to graphics processing. GPUs are often built with a highly parallel structure that provides more efficient processing than typical, general purpose central processing units (CPUs) for a range of complex graphics-related algorithms. For example, the complex algorithms may correspond to representations of three-dimensional computer graphics. A GPU may implement a number of so-called "primitive" graphics operations, such as forming points, lines, and triangles, to create complex, three-dimensional images on a display more quickly than drawing the images directly to the display with a CPU.

SUMMARY

This disclosure describes techniques of loading batch commands into a graphics processing unit (GPU). As described herein, a GPU driver for the GPU identifies one or more graphics processing objects to be used by the GPU in order to render a batch of graphics primitives. The GPU driver may formulate a batch command that includes indexes associated with the identified graphics processing objects. The GPU driver may then issue the batch command to the GPU. The GPU can use the indexes in the batch command to retrieve the graphics processing objects from memory. After retrieving the graphics processing objects from memory, the GPU may use the graphics processing objects to render the batch of graphics primitives.

In one aspect, a method comprises storing graphics processing objects in a memory module. The method further comprises identifying, with a GPU driver after storing the graphics processing objects in the memory module, ones of the graphics processing objects to be used by a GPU to render a batch of graphics primitives. The method also comprises formulating, with the GPU driver, a batch command to render the batch of graphics primitives with the GPU. The batch command includes indexes that indicate locations in the memory module at which the identified graphics processing objects are stored. In addition, the method comprises issuing the batch command to the GPU. The GPU uses indexes included in the batch command to retrieve the identified graphics processing objects from the memory module and uses the graphics processing objects to render the batch of graphics primitives in order to generate displayable graphics information.

In another aspect, a method comprises receiving, with a GPU, a batch command to render a batch of graphics primitives. The method also comprises using indexes included in the batch command to retrieve, with the GPU, ones of the graphics processing objects stored in the memory module. In addition, the method comprises processing, with the GPU after retrieving the graphics processing objects, the batch of graphics primitives using the retrieved graphics processing objects in order to generate displayable graphics information. A GPU driver identifies graphics processing objects to be used by the GPU to render the batch of graphics primitives after the graphics processing objects are stored in the locations in the memory module, and wherein the GPU driver formulates the batch command such that the batch command includes indexes associated with the identified graphics processing objects In another aspect, a device comprises a memory module that stores graphics processing objects and a central processing unit (CPU) that executes a GPU driver. The CPU that executes a GPU driver identifies, after the graphics processing object are stored in the memory module, ones of the graphics processing objects that are to be used by a GPU to render a batch of graphics primitives, formulates a batch command to render the batch of graphics primitives with the GPU, and issues the batch command to the GPU. The batch command includes indexes that indicate locations in the memory module at which the ones of the identified graphics processing objects are stored. The GPU receives the batch command, uses the indexes in the batch command to retrieve the graphics processing objects from the memory module, and renders the batch of graphics primitives using the retrieved graphics processing objects.

In another aspect, a device comprises a memory module that stores graphics processing objects, and a GPU. The GPU receives a batch command to render a batch of graphics primitives, uses the indexes included in the batch command to retrieve ones of the graphics processing objects stored in the memory module, and processes the batch of graphics primitives using the retrieved graphics processing objects in order to generate displayable graphics information. A GPU driver identifies graphics processing objects to be used by the GPU to render the batch of graphics primitives after the graphics processing objects are stored in the locations in the memory module, and wherein the GPU driver formulates the batch command such that the batch command includes indexes associated with the identified graphics processing objects.

In another aspect, a device comprises means for storing graphics processing objects, and means for executing a GPU driver. The means for executing the GPU driver identifies, after the graphics processing object are stored in the memory module, ones of the graphics processing objects that are to be used by a GPU to render a batch of graphics primitives, formulates a batch command to render the batch of graphics primitives with the GPU, and issues the batch command to the GPU. The batch command includes indexes that indicate locations in the memory module at which the ones of the identified graphics processing objects are stored. The GPU receives the batch command, uses the indexes in the batch command to retrieve the graphics processing objects from the memory module, and renders the batch of graphics primitives using the retrieved graphics processing objects.

In another aspect, a device comprises means for storing graphics processing objects and means for processing graphics. The means for processing graphics receives a batch command to render a batch of graphics primitives, uses the indexes included in the batch command to retrieve ones of the graphics processing objects stored in the memory module, and processes the batch of graphics primitives using the retrieved graphics processing objects in order to generate displayable graphics information. A GPU driver identifies graphics processing objects to be used by the GPU to render the batch of graphics primitives after the graphics processing objects are stored in the locations in the memory module, and wherein the GPU driver formulates the batch command such that the batch command includes indexes associated with the identified graphics processing objects.

In another aspect, a computer-readable medium comprises instructions that upon execution cause a processor to store graphics processing objects in a memory module. The instructions also cause the processor identify, with a graphics processing unit (GPU) driver after storing the graphics processing objects in the memory module, ones of the graphics processing objects to be used by a GPU to render a batch of graphics primitives. The instructions also cause the processor to formulate, with the GPU driver, a batch command to render the batch of graphics primitives with the GPU, wherein the batch command includes indexes that indicate locations in the memory module at which the identified graphics processing objects are stored. In addition, the instructions cause the processor to issue the batch command to the GPU. The GPU uses indexes included the batch command to retrieve the identified graphics processing objects from the memory module and uses the graphics processing objects to render the batch of graphics primitives in order to generate displayable graphics information.

In another aspect, a computer-readable medium comprises instructions that upon execution cause a processor to receive, with a graphics processing unit (GPU), a batch command to render a batch of graphics primitives. The instructions also cause the processor to use indexes included in the batch command to retrieve, with the GPU, ones of the graphics processing objects stored in the memory module. In addition, the instructions also cause the processor to process, with the GPU after retrieving the graphics processing objects, the batch of graphics primitives using the retrieved graphics processing objects in order to generate displayable graphics information. A GPU driver identifies graphics processing objects to be used by the GPU to render the batch of graphics primitives after the graphics processing objects are stored in the locations in the memory module, and wherein the GPU driver formulates the batch command such that the batch command includes indexes associated with the identified graphics processing objects.

The details of one or more examples are set forth in the accompanying drawings and the description below. Other features, objects, and advantages will be apparent from the description and drawings, and from the claims.

DETAILED DESCRIPTION

This disclosure describes techniques of loading batch commands into a graphics processing unit (GPU). As described herein, a GPU driver for the GPU identifies one or more graphics processing objects to be used by the GPU in order to render a batch of primitives. The GPU driver may formulate a batch command that includes indexes associated with the identified graphics processing objects. The GPU driver may then issue the batch command to the GPU. The GPU may use the indexes in the batch command to retrieve the graphics processing objects from memory. After retrieving the graphics processing objects from memory, the GPU may use the graphics processing objects to render the batch of graphics primitives.

Figure 1:
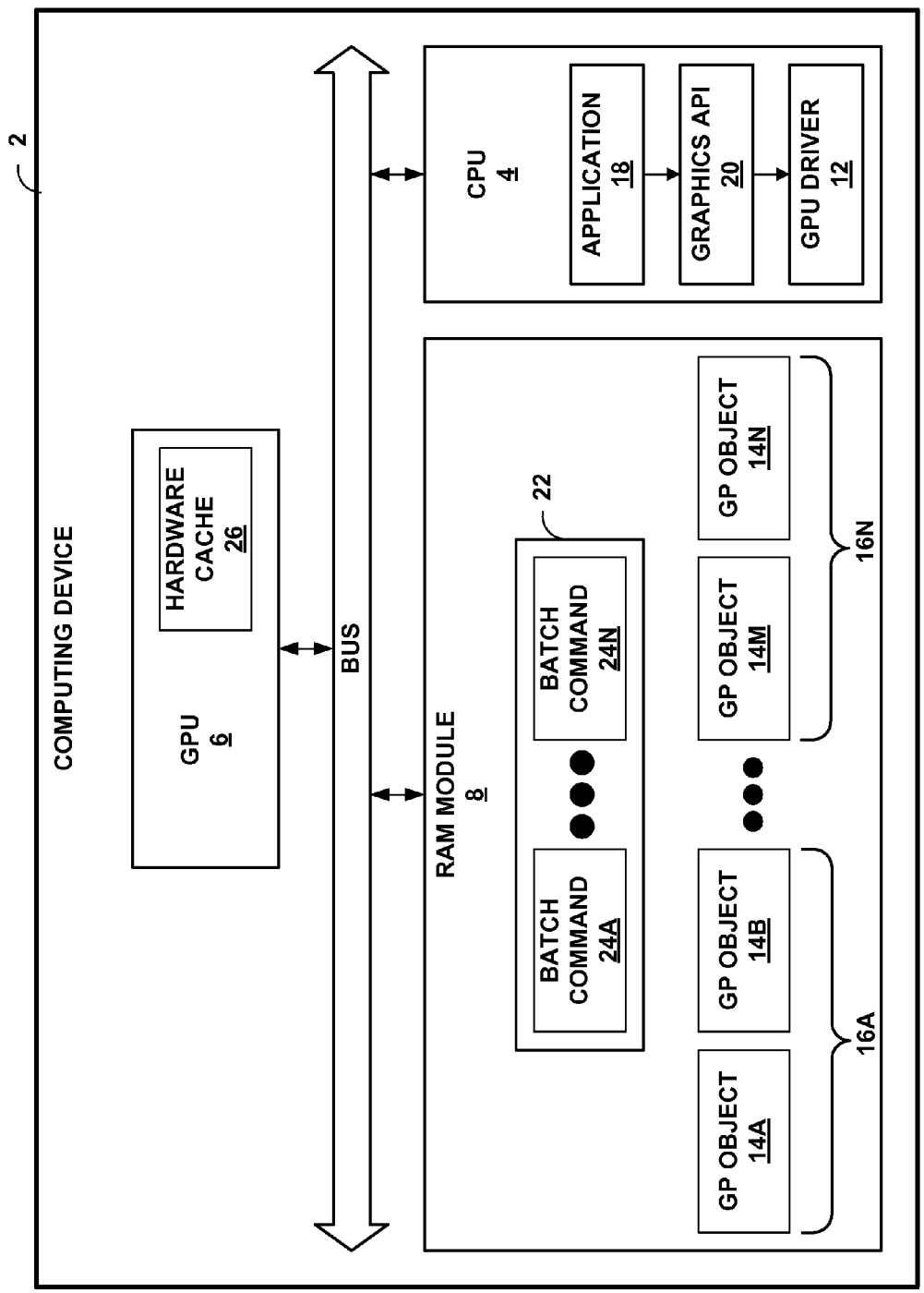
FIG. 1 is a block diagram illustrating an exemplary device that includes a graphics processing unit (GPU).

FIG. 1 is a block diagram illustrating an exemplary computing device 2. Computing device 2 may comprise a personal computer, a desktop computer, a laptop computer, a workstation, a video game platform or console, a cellular or satellite radiotelephone, a handheld device such as a portable video game device or a personal digital assistant, a personal music player, a server, an intermediate network device, a mainframe computer, or another type of device that outputs graphical information using one or more of the techniques described herein.

As illustrated in the example of FIG. 1, computing device 2 includes a CPU 4, a GPU 6, and a Random Access Memory (RAM) module 8 may communicate using a bus 10. Bus 10 may comprise a third generation bus such as a HyperTransport bus or an InfiniBand bus. Alternatively, bus 10 may comprise a second generation bus such as an Advanced Graphics Port bus, a Peripheral Component Interconnect (PCI) Express bus, or another type of bus or device interconnect. CPU 4 may comprise a general-purpose or a special-purpose microprocessor. For example, CPU 4 may comprise a Core 2 Processor provided by Intel Corporation of Santa Clara, Calif. or another type of microprocessor. GPU 6 comprises a dedicated graphics rendering device. GPU 6 may be integrated into the motherboard of computing device 2, may be present on a graphics card that is installed in a port in the motherboard of computing device 2, or may be otherwise configured to interoperate with computing device 2. RAM module 8 may be a Synchronous Dynamic Random Access Memory module, a Direct Rambus Dynamic Random Access Memory module, a Double Data Rate 2 or 3 Synchronous Random Access Memory module, or another type of random access memory module.

As illustrated in the example of FIG. 1, RAM module 8 may store a set of graphics processing objects 14A through 14N (collectively, "graphics processing objects 14"). In this context, a "graphics processing object" may comprise a data structure that specifies a type of graphics processing information that GPU 6 may use to perform a graphics operation. One example of a graphic processing object is a shader object. A shader object may comprise a set of instructions that, when executed by GPU 6, performs a shading operation that outputs a color for a particular pixel, given the shapes, the light sources, and camera position of a scene. Other example graphics processing objects may include vertex streams, texture sample state objects, texture memory objects, index buffers, programs/linking objects, state register objects, constant buffers, frame buffer objects, or other types of graphics processing objects.

Graphics processing objects 14 that specify different types of graphics processing information may be arranged in RAM module 8 as different ones of arrays 16A through 16N (collectively, "arrays 16"). Ones of graphics processing objects 14 in one of arrays 16 may be arranged in adjacent memory locations in RAM module 8. Each one of arrays 16 may comprise a block of memory that stores graphics processing objects that specify a particular type of graphics processing information. For example, if array 16A includes two graphics processing objects 14A and 14B, the first memory location of graphics processing object 14B may be the memory location in RAM module 8 that immediately follows the last memory location of graphics processing object 14A. In this example, graphics processing objects 14A and 14B may both be texture memory objects (i.e., objects that specify texture memory graphics processing information).

Each of arrays 16 may be associated with an array base address and an object size. Each of the graphics processing objects in an array of graphics processing objects may be associated with an index that specifies a memory location of a graphics processing object relative to an array base address. In this case, a combination of an array base address with the size and index of a graphics processing object may form the memory address of the graphics processing object. Because the ones of graphics processing objects 14 that specify different types of graphics processing information may be stored in different ones of arrays 16 and because each of arrays 16 may start at a different memory location, the indexes of graphics processing objects that specify different types of graphics processing information indicate memory locations of the graphics processing objects relative to different memory locations.

As illustrated in the example of FIG. 1, CPU 4 executes a software application 18 that generates high-level commands to perform graphics operations on graphics data. For example, software application 18 may be a video game application, a videoconferencing application, a user interface applications, a graphics design application, or another type of software application that includes graphics rendering functionality. The high-level commands generated by software application 18 may include geometry information (e.g., information for vertices of graphics primitives in an image) and other information that describes an image. Software application 18 may provide the high-level commands to an Application Programming Interface (API) 20. API 20 specifies a set of high-level graphics processing methods. For example, API 20 may specify the methods of the OpenGL, OpenVG (vector graphics), Graphics Device Interface (GDI), Quartz, QuickDraw, the Direct3D, or other application programming interfaces. When software application 18 provides a high-level command to API 20, API 20 may invoke one or more methods provided by a GPU driver 12. GPU driver 12 may be a software and/or firmware program executed by CPU 4 in kernel mode or part of GPU driver 12 in user mode for the purpose of facilitating interaction between API 20 and GPU 6.

When CPU 4 loads application 18, GPU driver 12 may pre-compile one or more graphics processing objects. For example, GPU driver 12 may pre-compile all shader objects. When GPU driver 12 compiles a graphics processing object, GPU driver 12 may store the graphics processing object in the one of arrays 16 that stores ones of graphics processing objects 14 that specify similar types of graphics processing information.

When API 20 invokes one or more of the methods implemented by GPU driver 12 in order to render a batch of graphics primitives, GPU driver 12 may identify ones of graphics processing objects 14 to be used by GPU 6 in order to render the batch of graphics primitives. For example, GPU driver 12 may identify a first shader object, a vertex stream object, a second shader object, a set of state registers for use in GPU 6, and a texture memory object as graphics processing objects to be used by GPU 6 to render the batch of graphics primitives. In 2D graphics, graphics primitives may include simple 2D shapes such as straight or curved lines, boxes, arbitrary polygons, circles, and other two dimensional shapes. In 3D graphics, graphics primitives may include simple 3D shapes such as cubes, cylinders, spheres, cones, pyramids, torus, freeform surfaces such as Bezier surfaces and non-uniform rational B-spline surfaces, and other simple 3D shapes. Rendering graphics primitives is a process of producing graphics information (e.g., pixels) of an image from these graphics primitives.

In many cases, application 18 or graphics API 20 provide GPU driver 12 with an identifier for a graphics processing object. The identifier may be a handler or an integer number. GPU driver 12 may create a mapping table that corresponds to an array of graphics processing objects. Each entry of the mapping table corresponds to an entry in the array. Furthermore, each entry of the mapping table may include an identifier and a "valid" flag. The "valid" flag is initialized to "invalid" for all empty entries at the beginning. When GPU driver 12 receives a new graphics processing object and an identifier of the new graphics processing object, GPU driver 12 may use the identifier to allocate an index or an entry in the mapping table. If the mapping table includes an entry for the identifier, GPU driver 12 may retrieve the index specified in the entry. If the mapping table does not include an entry for the identifier, GPU driver 12 may identify an unused entry in the mapping table and assign the index to the new object, set the identifier of the entry to the identifier, and change the "valid" flag of the entry to "valid." GPU driver 12 stores a newly compiled graphics processing object into the entry in the array. In another example, GPU driver 12 may look up or assign an index for an identifier using a hashing function or a cache mechanism.

GPU driver 12 may generate some graphics processing objects internally. For example, GPU driver 12 may generate graphics processing objects that specify state registers. When GPU driver 12 generates a graphics processing object internally, GPU driver 12 may assign a sequential number as an identifier to the graphics processing object. Furthermore, GPU driver 12 may generate a key (e.g., an integer result) by applying one or more hashing functions to the content of the graphics processing object before GPU driver 12 compiles the graphics processing object. GPU driver 12 may assign the key as an identifier of the graphics processing object. GPU driver 12 may use any other mechanism to generate an identifier for an object. After GPU driver 12 assigns the identifier to the graphics processing object, GPU driver 12 may look up an index of the mapping table as described in the previous paragraph.

After identifying the graphics processing objects to be used by GPU 6, GPU driver 12 may search through the ones of graphics processing objects 14 stored in RAM module 8 to find ones of graphics processing objects 14 that GPU driver 12 has identified as being needed to render the batch of graphics primitives. If GPU driver 12 is unable to find one of the identified graphics processing objects, GPU driver 12 may compile this one of the identified graphics processing object and store the compiled graphics processing object into one of arrays 16 in RAM module 8. For example, GPU driver 12 may compile a graphics processing object that specifies state register values used in GPU 6 by storing the values of these state registers as a graphics processing object in memory module 8.

After GPU driver 12 finds or compiles the identified ones of graphics processing objects 14, GPU driver 12 may formulate a batch command for the batch of graphics primitives in a master command buffer 22 in RAM module 8. Master command buffer 22 may be a region in memory module 8 that stores a set of batch commands 24A through 24N prior to the issuance of these batch commands to GPU 6. A batch command is a data structure that contains specifies a set of graphics processing objects. The batch command that GPU driver 12 formulates may include indexes, base addresses of the arrays, types of the graphics processing objects, and the sizes of the identified ones of graphics processing objects 14. The type of a graphics processing object may indicate a pipeline element in GPU 6 that is to use the graphics processing object.

In addition to the indexes and base addresses of the identified graphics processing objects, GPU driver 12 may formulate the batch command to include graphics processing objects that are very small in size. For example, if the size of a graphics processing object is not significantly larger than the combined size of an index and a base address, GPU driver 12 may formulate the batch command to directly include this graphics processing object. By directly including small graphics processing objects into the batch command, latency of retrieving the graphics processing objects with GPU 6 can be reduced. Aside from these small graphics processing objects, GPU driver 12 does not create any copies of the graphics processing objects in the batch command or master command buffer 22 when formulating the batch command.

If the identified ones of graphics processing objects 14 include more than one graphics processing object in a single one of arrays 16, GPU driver 12 only inserts the base address, graphics processing object type, and each object size of the array of graphics processing objects into a batch command once. For example, GPU driver 12 may identify a first shader object and a second shader object as graphics processing objects needed to render a batch of graphics primitives. If the first shader object and the second shader object are of the same type, the first shader object and the second shader object may be stored in the same one of arrays 16. When GPU driver 12 formulates a batch command that specifies the first shader object and the second shader object, GPU driver 12 may include the base address of this one of arrays 16, an index of the first shader object, and an index of the second shader object in the batch command. For example a current batch of graphics primitives uses five texture objects with cached indexes 2, 8, 15, 6, and 301. GPU driver 12 includes the five indexes and a base address of the array of texture objects in a texture state load instruction (i.e., a batch command) in the master command buffer. Including the indexes and the base address of the array does not require GPU driver 12 to sort the texture objects indicated by indexes 2, 8, 15, 6, and 301 together. Because GPU driver 12 does not sort these states together, there is no need to move or copy the data in these texture objects.

After GPU driver 12 completes a batch command in master command buffer 22, GPU driver 12 may "issue" the batch command to GPU 6. When GPU driver 12 issues the batch command to GPU 6, the batch command is transmitted via bus 10 to GPU 6.

When GPU 6 receives a batch command, GPU 6 may use the base addresses of the arrays and the indexes of the graphics processing objects to retrieve the graphics processing objects from RAM module 8. When GPU 6 retrieves one of graphics processing objects 14 from RAM module 8, GPU 6 may store a copy of the graphics processing object in a hardware cache 26 within GPU 6. If hardware cache 26 contains a copy of one of graphics processing objects 14, GPU 6 may only need to retrieve the copy of the graphics processing object from hardware cache 26 rather than retrieving the original graphics processing object from RAM module 8. After retrieving the graphics processing objects specified in the batch command, GPU 6 may use the graphics processing objects in the batch command to render the batch of graphics primitives in order to produce displayable graphics information.

The techniques described in this disclosure may provide one or more advantages. For example, a computing device that implements these techniques does not typically create a copy of the graphics processing objects in the batch command for each batch of graphics primitives. Rather, the device creates indexes of the graphics processing objects in the batch command. Because the indexes of the graphics processing objects may be significantly smaller than the graphics processing objects themselves, less bandwidth on bus 10 may be required in order to transmit a batch command to GPU 6. Furthermore, because GPU 6 may cache individual graphics processing objects in hardware cache 26, it might not be necessary for one of the graphics processing objects to be transmitted over bus 10 from RAM module 8 to GPU 6. Because the techniques described in this disclosure may result in fewer graphics processing objects being transmitted over bus 10, bus 10 may have more bandwidth available with which to transmit other information. As a result, the overall performance of a device that implements the techniques described in this disclosure may be improved. In another example, time may be saved because hardware cache 26 in GPU 6 does not need to be flushed between batches of graphics primitives. For instance, a first batch may use a shader object. Because the first batch uses the shader object, a copy of the shader object may be stored in hardware cache 26. Subsequently, GPU 6 may render a second batch of graphics primitives. Later, GPU 6 may render a third batch of graphics primitives. The third batch of graphics primitives may use the shader object used by the first batch. Because the shader object may still be in hardware cache 26, it may be unnecessary for GPU 6 to retrieve the shader object from RAM module 8. This may conserve time, power, and bandwidth.

Figure 2:
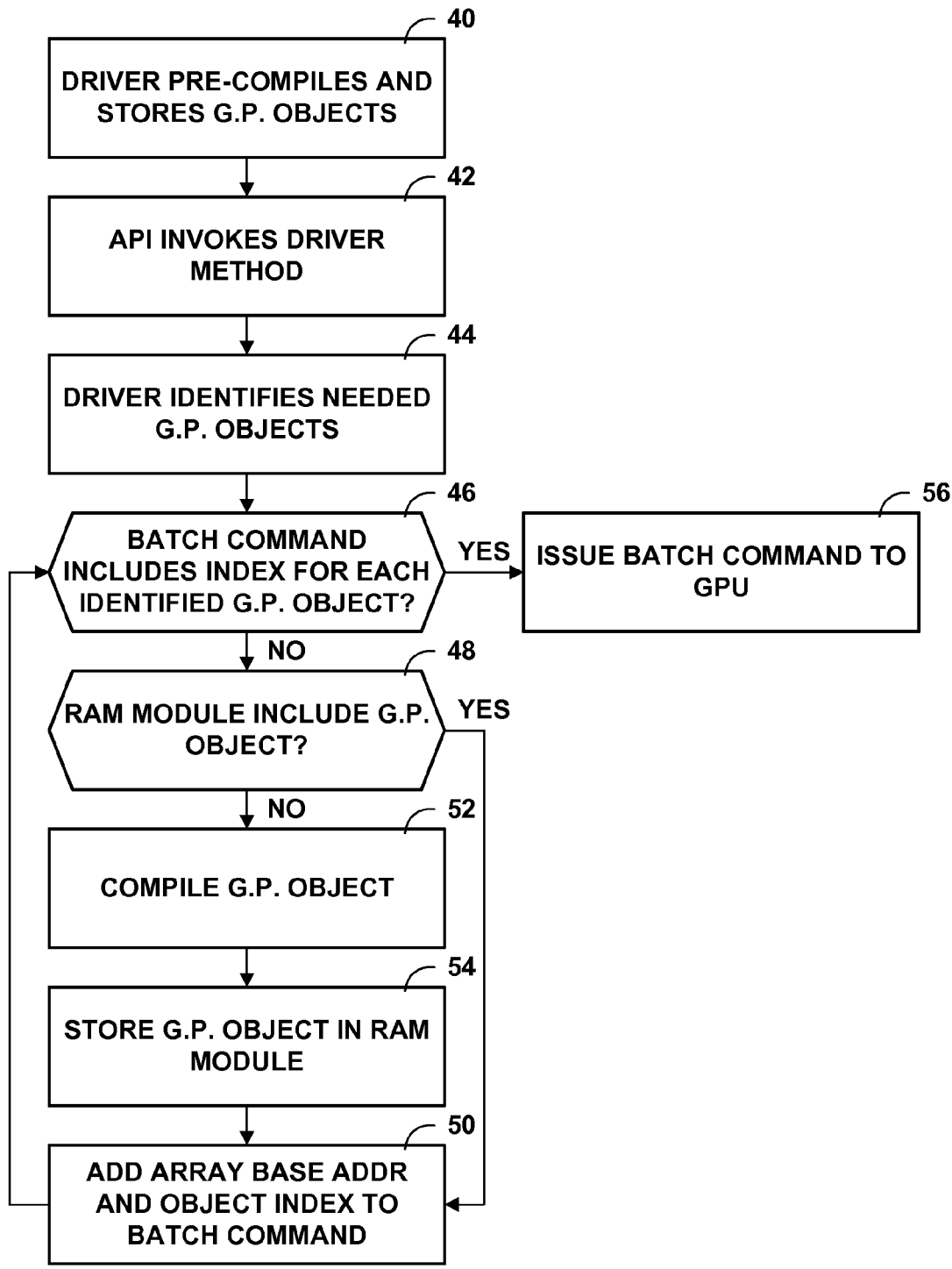
FIG. 2 is a flowchart illustrating an exemplary operation of a GPU driver operating in a central processing unit (CPU).

FIG. 2 is a flowchart illustrating an exemplary operation of GPU driver 12 operating in CPU 4. Initially, GPU driver 12 may pre-compile one or more graphics processing objects and store these graphics processing objects in arrays 16 in RAM module 8 (40). Subsequently, API 20 may invoke a method of GPU driver 12 in order to perform a graphics operation (42). When API 20 invokes the method of GPU driver 12, GPU driver 12 may identify a set of graphics processing objects that are needed to perform the graphics operation (44). After identifying the set of graphics processing objects, GPU driver 12 may determine whether a batch command for the graphics operation includes an index for each of the graphics processing objects in the set (46). If the batch command for the graphics operation does not include an index for each of the graphics processing objects in the set ("NO" of 46), GPU driver 12 determines whether RAM module 8 includes a graphics processing object in the set that does not have an index in the batch command (48). If GPU driver 12 determines that RAM module 8 includes a graphics processing object in the set that does not have an index in the batch command ("YES" of 48), GPU driver 12 may add the array base address and the index of the graphics processing object to the batch command (50). GPU driver 12 may not add the array base address to the batch command if the batch command already includes the array base address. After adding the array base address and the index of the graphics processing object to the batch command, GPU driver 12 may loop back and again determine if the batch command includes an index for each of the identified graphics processing objects (46).

If RAM module 8 does not include the graphics processing object ("NO" of 48), GPU driver 12 may compile the graphics processing object (52). After compiling the graphics processing object, GPU driver 12 may store the graphics processing object in RAM module 8 (54). Next, GPU driver 12 may insert the array base address and the index of the graphics processing object into the batch command (50). After adding the array base address and the index of the graphics processing object to the batch command, GPU driver 12 may loop back and again determine if the batch command includes an index for each of the identified graphics processing objects (46).

If the batch command does includes an index for each of the identified graphics processing objects ("YES" of 46), GPU driver 12 may issue the batch command to GPU 6 (56).

Figure 3:
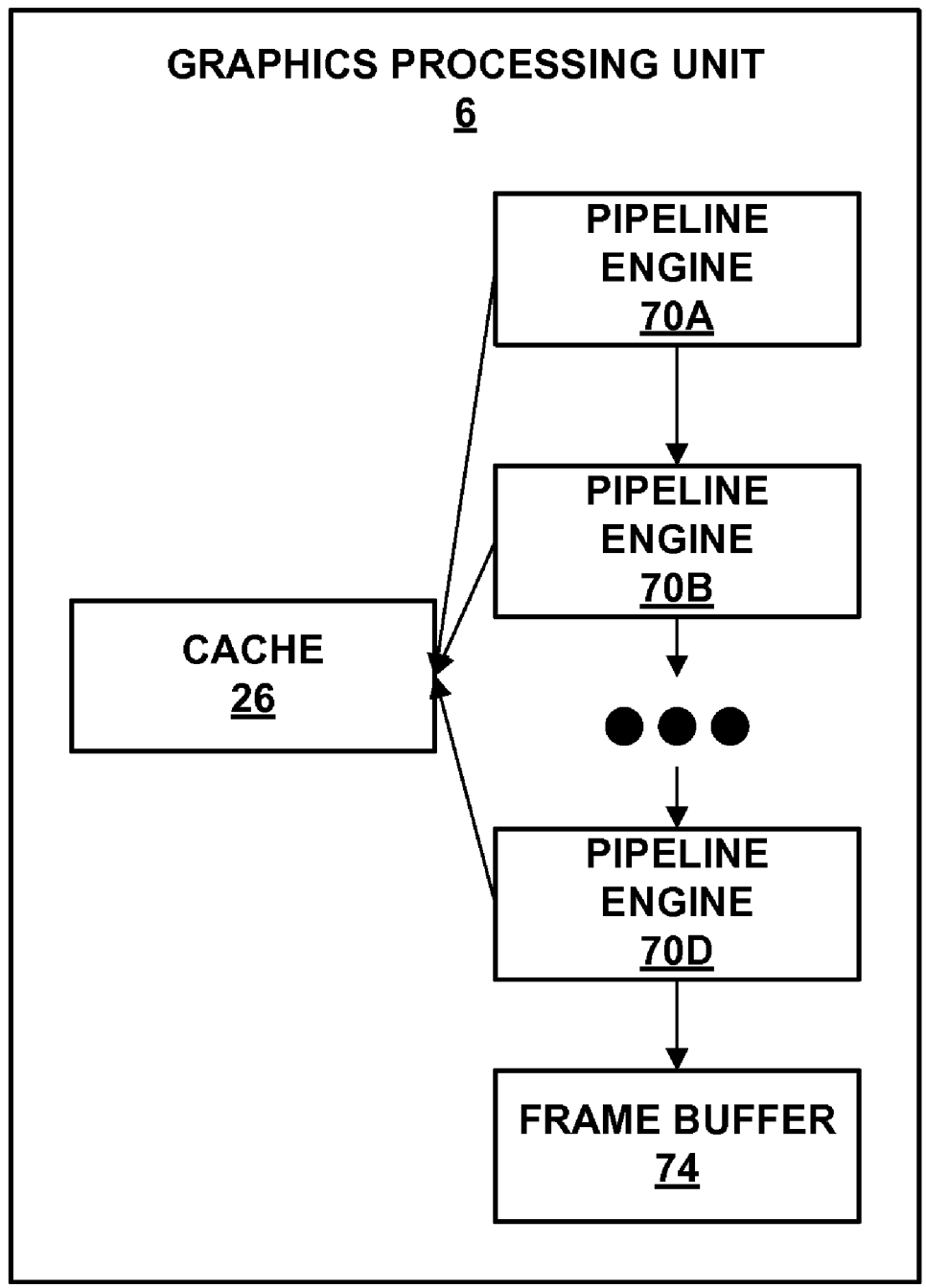
FIG. 3 is a block diagram illustrating details of an exemplary GPU.

FIG. 3 is a block diagram illustrating details of an exemplary GPU 6. In the example of FIG. 3, GPU 6 includes a set of pipeline engines 70A through 70N (collectively "pipeline engines 70"). Each of pipeline engines 70 may perform operations in a graphics processing pipeline. For example, pipeline engine 70A may perform command evaluation operations, pipeline engine 70B may perform per-vertex operations and primitive assembly operations, pipeline engine 70C may process textures, pipeline engine 70D may perform shading operations, and so on. Pipeline engines 70 may be Application-Specific Integrated Circuits (ASICs), Field-Programmable Gate Arrays (FPGAs), microprocessors, or other types of logic devices. Pipeline engines 70 may be designed to perform particular graphics-related functions or may be implemented in such a way that each of pipeline engines 70 may execute an arbitrary set of instructions. For example, if pipeline engines 70 are implemented in such a way that each of pipeline engines 70 may execute an arbitrary set of instructions, pipeline engines 70 may be used to perform complex mathematical operations. In this way, GPU 6 may act as a "general purpose" graphics processing unit.

When a first one of pipeline engines 70 receives a batch command from CPU 4, the first one of the pipeline engines may generate requests to retrieve each of the graphics processing objects specified in the batch command. After the first one of the pipeline engines generates a request to retrieve one of the graphics processing objects, hardware cache 26 in GPU 6 may determine whether hardware cache 26 stores a copy of the one of the graphics processing objects. Hardware cache 26 may be a hardware cache and may have various replacement policies including direct mapping, 2-way associative, fully associative, or other replacement policies. If hardware cache 26 stores a copy of the one of the graphics processing objects, hardware cache 26 may return the copy of the one of the graphics processing objects to the first one of pipeline engines 70. On the other hand, if hardware cache 26 does not store a copy of the one of the graphics processing objects, hardware cache 26 may forward the request to RAM module 8. When RAM module 8 returns the one of the graphics processing objects, hardware cache 26 may store a copy of the one of the graphics processing objects. Hardware cache 26 may then forward the one of the graphics processing objects to the first one of pipeline engines 70. In another example, the first one of pipeline engines 70 may provide the indexes and array base addresses to one or more of pipeline engines 70. These ones of pipeline engines 70 may then use the indexes and array base addresses to retrieve graphics processing objects. For instance, the first one of pipeline engines 70 may load a texture engine graphics processing object into pipeline engine 70B and may provide pipeline engine 70B with indexes and an array base address of one or more texture map graphics processing objects. When pipeline engine 70B executes the texture engine, pipeline engine 70B may retrieve various ones of the texture map graphics processing objects as needed.

When the first one of pipeline engines 70 receives graphics processing objects for a batch command, the first one of pipeline engines 70 may load the graphics processing objects into various ones of pipeline engines 70. For example, the first one of pipeline engines 70 may provide a first shader object to pipeline engine 70B and a second shader object to pipeline engine 70C. In this example, pipeline engine 70B may execute instructions in the first shader object and provide values that result from executing the first shader object to pipeline engine 70C. Pipeline engine 70C may execute instructions in the second shader object using the values provided by pipeline 70B. Pipeline engine 70C may output values that are used by pipeline engine 70D, and so on.

A last one of pipeline engines 70 may output graphics information to a frame buffer 74. For example, the last one of pipeline engines 70 (e.g., pipeline engine 70D) may output pixels to frame buffer 74. The pixels in frame buffer 74 may represent graphics information that may be displayed on a monitor, screen, or other display apparatus.

When GPU 6 finishes processing a batch command, hardware cache 26 may not be flushed or invalidated. Rather, graphics processing objects may remain stored in hardware cache 26 for several batch commands. In this way, if a subsequent batch command specifies a graphics processing object used in a previous batch command, it may be unnecessary for hardware cache 26 to retrieve the graphics processing object from RAM module 8. Hardware cache 26 may be flushed or invalidated when GPU driver 12 instructs GPU 6 to flush or invalidate hardware cache 26. In addition, graphics processing objects in hardware cache 26 may be replaced by new graphics processing objects.

Figure 4:
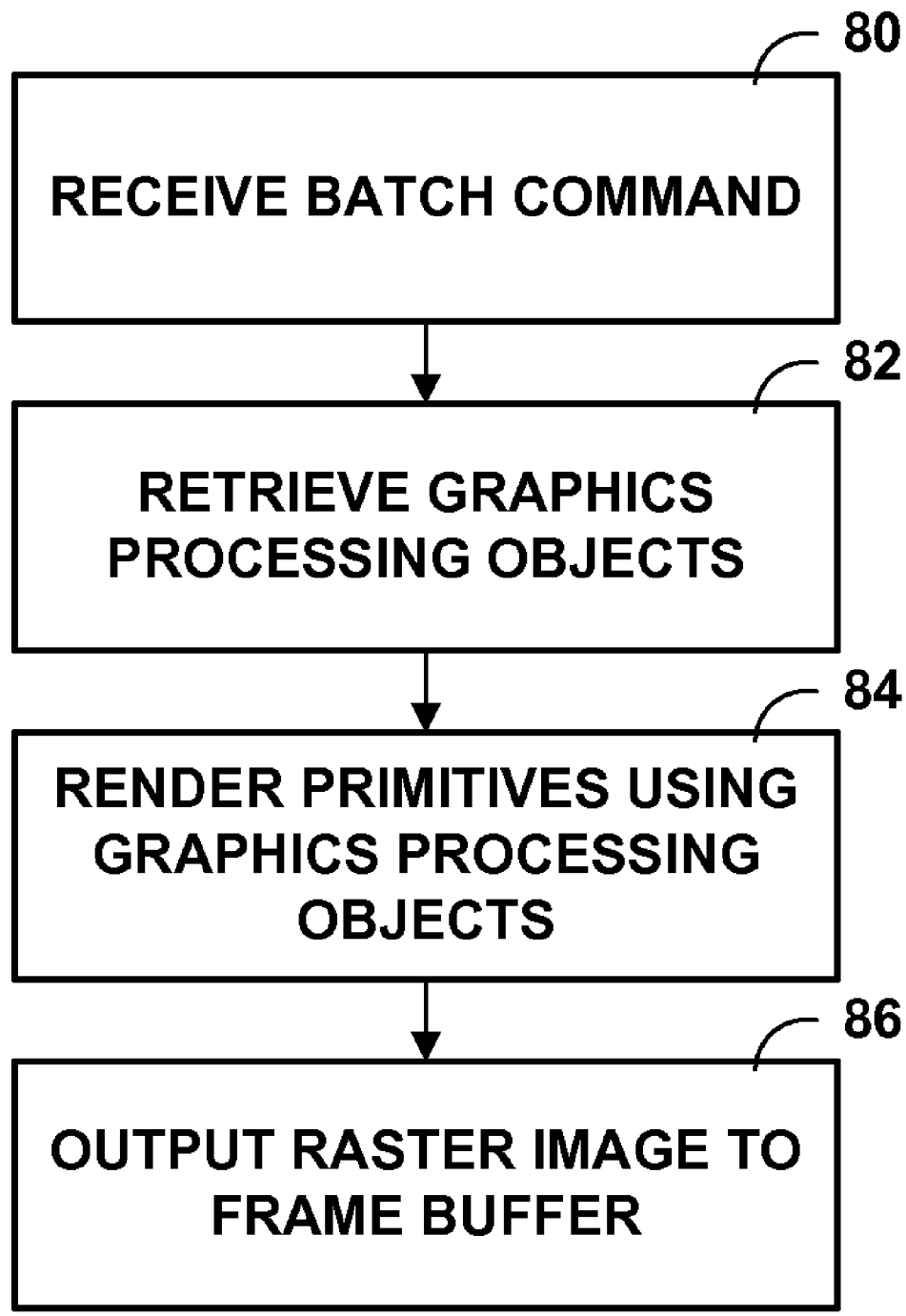
FIG. 4 is a flowchart illustrating an exemplary operation of a GPU.

FIG. 4 is a flowchart that illustrates an exemplary operation of GPU 6. Initially, GPU 6 receives a batch command issued by GPU driver 12 to render a batch of graphics primitives (80). After receiving the batch command, GPU 6 may retrieve from RAM module 8 or hardware cache 26 graphics processing objects at memory locations indicated by indexes in the batch command (82). After retrieving the graphics processing objects, GPU 6 may use pipeline elements 70 to render the batch of graphics primitives using the retrieved graphics processing objects (84). When GPU 6 finishes rendering the batch of graphics primitives using the retrieved graphics processing objects, GPU 6 may output a raster image to frame buffer 74 (86).

In one or more exemplary embodiments, the functions described may be implemented in hardware, software, and/or firmware, or any combination thereof. If implemented in hardware, the functions may be implemented in one or more microprocessors, microcontrollers, digital signal processors (DSPs), application specific integrated circuits (ASICs), field programmable gate arrays (FPGAs), or the like. Such components may reside within a communication system, data writing and/or reading system, or other systems. If implemented in software, the functions may be stored on or transmitted over as one or more instructions or code on a computer-readable medium. Computer-readable media includes both computer storage media such as a computer program product that includes a computer readable medium, and communication media including any medium that facilitates transfer of a computer program from one place to another. A storage media may be any available media that can be accessed by a computer. By way of example, and not limitation, such computer-readable media can comprise volatile or non-volatile storage, random access memory (RAM), read only memory (ROM), flash memory, electrically erasable read only memory (EEPROM), compact disk read only memory (CD-ROM) or other optical disk storage, hard disk, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various embodiments of the invention have been described. These and other embodiments are within the scope of the following claims.

The invention claimed is:

1. A method comprising:
storing, by a graphics processing unit (GPU) driver executed by a central processing unit, graphics processing objects in a memory module, wherein storing the graphics processing objects comprises storing a subset of the graphics processing objects as an array in the memory module, wherein the array corresponds to a particular type of graphics processing information, wherein each of the graphics processing objects in the subset corresponds to the particular type of graphics processing information, and wherein a GPU corresponding to the GPU driver is communicatively coupled to the memory module;
identifying, by the GPU driver after storing the graphics processing objects in the memory module, a set of the graphics processing objects to be used by the GPU to render a batch of graphics primitives, wherein at least some of the batch of graphics primitives correspond to the particular type of graphics processing information;
formulating, by the GPU driver, a batch command to render the batch of graphics primitives with the GPU, wherein the batch command includes a base address that identifies a memory location of the array in the memory module and a set of indexes that indicate locations in the array of the subset of graphics processing objects in the set that are to be used by the GPU to render the batch of graphics primitives, wherein the set of indexes identify the graphics processing objects of the particular type corresponding to the at least some of the batch of graphics primitives; and
issuing, by the GPU driver, the batch command to the GPU without passing the graphics processing objects, which were stored to the memory module, to the GPU,
wherein the batch command is formulated to cause the GPU to retrieve the set of graphics processing objects from the memory module, to retrieve the subset of graphics processing objects in the set of graphics processing objects from the locations in the array specified by the set of indexes, and to use the set of graphics processing objects to render the batch of graphics primitives in order to generate displayable graphics information.

2. The method of claim 1,
wherein formulating the batch command comprises compiling a graphics processing object when the memory module does not contain one of the identified graphics processing objects; and
when the compiled graphics processing object corresponds to the particular type of graphics processing information for the array:
storing the compiled graphics processing object in the array; and
formulating the batch command to include an index in the set of indexes that indicates a location in the array at which the compiled graphics processing object is stored.

3. The method of claim 1, wherein the method further comprises receiving, with the GPU driver, an instruction from a graphics Application Programming Interface (API) that causes the GPU driver to identify the subset of graphics processing objects to be used by the GPU to render the batch of graphics primitives.

4. The method of claim 1,
wherein the method further comprises compiling a graphics processing object when the GPU driver is loaded; and
wherein storing graphics processing objects comprises storing the compiled graphics processing object in the memory module.

5. The method of claim 1, wherein the batch command is formulated to cause the GPU to cache the retrieved graphics processing objects in a hardware cache in the GPU.

6. The method of claim 5, wherein the batch command is formulated to cause the GPU to use one of the cached graphics processing objects to render a different batch of graphics primitives.

7. The method of claim 1, wherein storing graphics processing objects comprises storing a shader object that includes a set of instructions that, when executed by the GPU, outputs a color for a particular pixel, given shapes, light sources, and a camera position of a scene.

8. The method of claim 1, wherein storing graphics processing objects comprises storing values of state registers for use in the GPU as a graphics processing object.

9. The method of claim 1, wherein the subset of graphics processing objects comprises a first subset of graphics processing objects, wherein the array comprises a first array, wherein the batch command comprises a first batch command, wherein the particular type comprises a first particular type, wherein the base address comprises a first base address, wherein the set of indexes comprises a first set of indexes, wherein the memory location comprises a first memory location,
wherein storing graphics processing objects comprises storing a second subset of the graphics processing objects as a second array in the memory module, wherein the second array corresponds to a second particular type of graphics processing information, wherein the second particular type of graphics processing information is different than the first particular type of graphics processing information, wherein each of the second subset of graphics processing objects corresponds to the second particular type of graphics processing information,
wherein at least some of the batch of graphics primitives corresponds to the second particular type of graphics processing information, and
wherein formulating comprises formulating the batch command to include a second base address that identifies a second memory location of the second array in the memory module and a second set of indexes that indicate locations in the second array of the second subset of graphics processing objects in the set that are to be used by the GPU to render the batch of graphics primitives.

10. The method of claim 1, wherein formulating comprises formulating a plurality of batch commands, wherein each of the batch commands includes the base address that identifies the memory location of the array in the memory module and a respective set of indexes that indicate locations in the array of respective subsets of graphics processing objects in a respective set of graphics processing objects that are to be used by the GPU to render a respective batch of graphics primitives.

11. A method comprising:
receiving, with a graphics processing unit (GPU) from a GPU driver executed by a central processing unit, a batch command to render a batch of graphics primitives from a set of graphics processing objects, wherein the batch command includes a base address that identifies a memory location of an array in a memory module and a set of indexes that indicate locations of a subset of the set of graphics processing objects, wherein the subset of graphics processing objects are in the array, wherein the array corresponds to a particular type of graphics processing information, and wherein each of the subset of graphics processing objects corresponds to the particular type of graphics processing information, such that the set of indexes identify the graphics processing objects of the particular type corresponding to the array of the subset that are to be used to render at least some of the batch of graphics primitives, without receiving any of the subset of graphics processing objects in the batch command;

retrieving, with the GPU, the set of graphics processing objects including the subset of graphics processing objects from the memory module, wherein retrieving comprises retrieving the subset of graphics processing objects from the locations of the array identified by the indexes; and processing, with the GPU after retrieving the set of graphics processing objects, the batch of graphics primitives using the set of graphics processing objects including the subset of graphics processing objects in order to generate displayable graphics information.

12. The method of claim 11, wherein the GPU driver compiles a graphics processing object and stores the compiled graphics processing object in the memory module when the GPU driver identifies a graphics processing object that is to be used by the GPU to render the batch of graphics primitives but is not currently stored in the memory module.

13. The method of claim 11, wherein the method further comprises caching one of the retrieved graphics processing objects in a cache within the GPU; and using the indexes in the batch command to retrieve, with the GPU, the graphics processing objects from the cache, wherein the GPU uses the indexes in the batch command to retrieve the graphics processing objects from the memory module when the cache does not include the graphics processing objects.

14. The method of claim 11, wherein processing the batch of graphics primitives comprises:

providing, with a first pipeline engine in the GPU, a one of the retrieved graphics processing objects to a second pipeline engine in the GPU; and executing, with the second pipeline engine, instructions in the one of the graphics processing objects provided to the second pipeline engine in order to perform a graphics processing operation.

15. The method of claim 14, wherein executing instructions comprises executing, with the second pipeline engine, instructions in the one of the graphics processing objects provided to the second pipeline engine in order to perform a shading operation.

16. The method of claim 14, wherein processing the batch of graphics primitives further comprises:

providing, with the first pipeline engine, one of the indexes in the batch command to the second pipeline engine; and using, with the second pipeline engine, the one of the indexes provided to the second pipeline engine by the first pipeline engine to retrieve one of the graphics processing objects.

17. A device comprising:

a memory module that stores graphics processing objects, wherein the memory module stores a subset of the graphics processing objects as an array that corresponds to a particular type of graphics processing information, and wherein each of the graphics processing objects in the subset corresponds to the particular type of graphics processing information; and a central processing unit (CPU) that executes a graphics processing unit (GPU) driver that stores the graphics processing objects to the memory module, stores the subset of the graphics processing objects as the array, identifies, after the graphics processing object are stored in the memory module, a set of the graphics processing objects that are to be used by a GPU to render a batch of graphics primitives, wherein at least some of the batch of graphics primitives correspond to the particular type of graphics processing information, formulates a batch command to render the batch of graphics primitives with the GPU, and issues the batch command to the GPU without passing the graphics processing objects, which were stored to the memory module, to the GPU, wherein the GPU corresponds to the GPU driver and is communicatively coupled to the memory module, wherein the batch command includes a base address that identifies a memory location of the array in the memory module and a set of indexes that indicate locations in the array of the subset of graphics processing objects in the set that are to be used by the GPU to render the batch of graphics primitives, wherein the set of indexes identify the graphics processing objects of the particular type corresponding to the at least some of the batch of graphics primitives, and wherein the CPU executes the GPU driver to formulate the batch command to cause the GPU to retrieve the set of graphics processing objects from the memory module, retrieve the subset of graphics processing objects in the set of graphics processing objects from the locations in the array specified by the set of indexes, and to render the batch of graphics primitives using the retrieved graphics processing objects.

18. The device of claim 17, wherein when the GPU driver formulates the batch command, the GPU driver compiles a graphics processing object when the memory module does not contain one of the identified graphics processing objects, and wherein when the compiled graphics processing object corresponds to the particular type of graphics processing information for the array, the GPU driver stores the compiled graphics processing object in the array and includes in the batch command an index that indicates a location in the array at which the compiled graphics processing object is stored.

19. The device of claim 17, wherein the device further comprises a graphics Application Programming Interface (API) that causes the GPU driver to identify graphics processing objects to be used by the GPU to render the batch of graphics primitives.

20. The device of claim 17, wherein the GPU driver compiles a graphics processing object when a graphics application is loaded and stores the compiled graphics processing object in the memory module.

21. The device of claim 17, wherein the GPU driver formulates the batch command to cause the GPU to cache the retrieved graphics processing objects in a hardware cache in the GPU.

22. The device of claim 21, wherein the GPU driver formulates the batch command to cause the GPU to use one of the cached graphics processing objects to render a different batch of graphics primitives.

23. The device of claim 17, wherein the graphics processing objects stored in the memory module include a shader object that includes a set of instructions that, when executed by the GPU, outputs a color for a particular pixel, given shapes, light sources, and a camera position of a scene.

24. The device of claim 17, wherein the graphics processing objects stored in the memory module include values of state registers for use in the GPU.

25. The device of claim 17, wherein the subset of graphics processing objects comprises a first subset of graphics processing objects, wherein the array comprises a first array, wherein the batch command comprises a first batch command, wherein the particular type comprises a first particular type, wherein the base address comprises a first base address, wherein the set of indexes comprises a first set of indexes, wherein the memory location comprises a first memory location,
- wherein the memory module is configured to store a second subset of the graphics processing objects as a second array, wherein the second array corresponds to a second particular type of graphics processing information, wherein the second particular type of graphics processing information is different than the first particular type of graphics processing information, wherein each of the second subset of graphics processing objects corresponds to the second particular type of graphics processing information,
- wherein at least some of the batch of graphics primitives corresponds to the second particular type of graphics processing information, and
- wherein the CPU is configured to formulate the batch command to include a second base address that identifies a second memory location of the second array in the memory module and a second set of indexes that indicate locations in the second array of the second subset of graphics processing objects in the set that are to be used by the GPU to render the batch of graphics primitives.

26. A device comprising:
a memory module that stores graphics processing objects, wherein the memory module stores a subset of the graphics processing objects as an array that corresponds to a particular type of graphics processing information, and wherein each of the graphics processing objects in the subset corresponds to the particular type of graphics processing information; and
a graphics processing unit (GPU) that receives, from a GPU driver executed by a central processing unit, a batch command to render a batch of graphics primitives from a set of graphics processing objects, wherein the batch command includes a base address that identifies a memory location of an array in the memory module and a set of indexes that indicate locations of the subset of the set of graphics processing objects, wherein the subset of graphics processing objects are in the array, such that the set of indexes identify the graphics processing objects of the particular type corresponding to the array of the subset that are to be used to render at least some of the batch of graphics primitives, wherein the GPU does not receive any of the subset of graphics processing objects in the batch command, and wherein the GPU retrieves the set of graphics processing objects including the subset of graphics processing objects from the memory module, retrieves the subset of the graphics processing objects from the locations of the array identified by the indexes, and processes the batch of graphics primitives using the set of graphics processing objects in order to generate displayable graphics information.

27. The device of claim 26, wherein the device further comprises a Central Processing Unit (CPU) that executes the GPU driver to identify graphics processing objects to be used by the GPU to render the batch of graphics primitives after the graphics processing objects are stored in the locations in the memory module, and wherein the GPU driver formulates the batch command such that the batch command includes indexes associated with the identified graphics processing objects.

28. The device of claim 27, wherein the CPU executes the GPU driver to compile a graphics processing object and to store the compiled graphic processing object in the memory module when the GPU driver identifies a graphics processing object that is to be used by the GPU to render the batch of graphics primitives but is not currently stored in the memory module.

29. The device of claim 26,
wherein the GPU comprises a hardware cache that caches one of the retrieved graphics processing objects,
wherein the GPU uses the indexes in the batch command to retrieve from the hardware cache the cached one of the graphics processing objects, and
wherein the GPU uses the indexes in the batch command to retrieve the graphics processing objects from the memory module when the hardware cache does not include the graphics processing objects.

30. The device of claim 26,
wherein the GPU comprises a first pipeline engine and a second pipeline engine,
wherein the first pipeline engine provides a one of the retrieved graphics processing objects to the second pipeline engine, and
wherein the second pipeline engine executes instructions in the one of the retrieved graphics processing objects in order to perform a graphics processing operation.

31. The device of claim 30, wherein when the second pipeline engine executes the instructions in the one of the retrieved graphics processing objects, the second pipeline engine performs a shading operation.

32. The device of claim 30,
wherein the first pipeline engine provides one of the indexes in the batch command to the second pipeline engines; and
wherein the second pipeline engine uses the one of the indexes to retrieve one of the graphics processing objects from the memory module.

33. A device comprising:
means for storing graphics processing objects, wherein the means for storing the graphics processing objects comprises means for storing a subset of the graphics processing objects as an array, wherein the array corresponds to a particular type of graphics processing information, and wherein each of the subset of graphics processing objects corresponds to the particular type of graphics processing information; and
means for executing a graphics processing unit (GPU) driver that stores the graphics processing objects to the memory module, stores the subset of the graphics processing objects as the array, identifies, after the graphics processing objects are stored in the means for storing graphics processing objects, a set of the graphics processing objects that are to be used by a GPU to render a batch of graphics primitives wherein at least some of the batch of graphics primitives correspond to the particular type of graphics processing information, that formulates a batch command to render the batch of graphics primitives, wherein the batch command includes a base address that identifies a memory location of the array in the means for storing graphics processing objects and a set of indexes that indicate locations in the array of the subset of graphics processing objects in the set that are to be used by the GPU to render the batch of graphics primitives, wherein the set of indexes identify the graphics processing objects of the particular type corresponding to the at least some of the batch of graphics primitives, and that issues the batch command to the GPU without passing the graphics processing objects, which were stored to the memory module, to the GPU, wherein the GPU corresponds to the GPU driver and is communicatively coupled to the memory module.

34. The device of claim 33, wherein when the means for executing the GPU driver formulates the batch command, the means for executing the GPU driver compiles a graphics processing object when the memory module does not contain one of the identified graphics processing objects, and
wherein when the compiled graphics processing object corresponds to the particular type of graphics processing information for the array, the means for executing the GPU driver stores the compiled graphics processing object in the array and includes in the set of indexes of the batch command an index that indicates a location in the array at which the compiled graphics processing object is stored.

35. The device of claim 33, wherein the means for executing the GPU driver compiles a graphics processing object when a graphics application is loaded and stores the compiled graphics processing object in the memory module.

36. The device of claim 33,
wherein the means for storing graphics processing objects stores sets of the graphics processing objects that specify different types of graphics processing information as different arrays; and
wherein the means for executing the GPU driver stores, in the batch command, base addresses of each of the arrays that include one or more of the identified graphics processing objects.

37. The device of claim 33, wherein the GPU caches the retrieved graphics processing objects in a hardware cache in the GPU.

38. A device comprising:
means for storing graphics processing objects, wherein the means for storing the graphics processing objects comprises means for storing a subset of the graphics processing objects as an array, wherein the array corresponds to a particular type of graphics processing information, and wherein each of the subset of graphics processing objects corresponds to the particular type of graphics processing information;
means for receiving, from a GPU driver, a batch command to render a batch of graphics primitives from a set of graphics processing objects, wherein the batch command includes a base address that identifies a memory location of an array in a memory module and a set of indexes that indicate locations of a subset of the set of graphics processing objects, wherein the subset of graphics processing objects are in the array, wherein the array corresponds to a particular type of graphics processing information, and wherein each of the subset of graphics processing objects corresponds to the particular type of graphics processing information, such that the set of indexes identify the graphics processing objects of the particular type corresponding to the array of the subset that are to be used to render at least some of the batch of graphics primitives, without receiving any of the subset of graphics processing objects in the batch command;
means for retrieving the set of graphics processing objects including the subset of graphics processing objects from the memory module, wherein the means for retrieving comprises means for retrieving the subset of graphics processing objects from the locations of the array identified by the indexes; and
means for processing the batch of graphics primitives using the set of graphics processing objects including the subset of graphics processing objects in order to generate displayable graphics information.

39. The device of claim 38, wherein the device comprises means for executing the GPU driver.

40. The device of claim 38, wherein the GPU driver compiles a graphics processing object and stores the compiled graphic processing object in the memory module when the GPU driver identifies a graphics processing object that is to be used by the GPU to render the batch of graphics primitives but is not currently stored in the memory module.

41. The device of claim 38,
wherein the means for processing graphics comprises means for caching one of the retrieved graphics processing objects,
wherein the means for processing graphics uses the indexes in the batch command to retrieve from the hardware cache the cached one of the graphics processing objects, and
wherein the means for processing graphics uses the indexes in the batch command to retrieve the graphics processing objects from the memory module when the hardware cache does not include the graphics processing objects.

42. The device of claim 38, wherein the means for processing graphics comprises:
first means for processing a graphics operation;
second means for processing a graphics operation;
wherein the first means provides a one of the retrieved graphics processing objects to the second means, and
wherein the second means executes instructions in the one of the retrieved graphics processing objects in order to perform a graphics processing operation.

43. A non-transitory computer-readable medium comprising instructions, wherein the instructions upon execution cause a processor executing a graphics processing unit (GPU) driver to:
store graphics processing objects in a memory module, wherein the instructions to store the graphics processing objects comprises instructions to store a subset of the graphics processing objects as an array, wherein the array corresponds to a particular type of graphics processing information, wherein each of the subset of graphics processing objects corresponds to the particular type of graphics processing information, and wherein a GPU corresponding to the GPU driver is communicatively coupled to the memory module;
identify, after storing the graphics processing objects in the memory module, a set of the graphics processing objects to be used by a GPU to render a batch of graphics primitives, wherein at least some of the batch of graphics primitives correspond to the particular type of graphics processing information;
formulate a batch command to render the batch of graphics primitives with the GPU, wherein the batch command includes a base address that identifies a memory location of the array in the memory module and a set of indexes that indicate locations in the array of the subset of graphics processing objects in the set that are to be used by the GPU to render the batch of graphics primitives, wherein the set of indexes identify the graphics processing objects of the particular type corresponding to the at least some of the batch of graphics primitives; and issue the batch command to the GPU without passing the graphics processing objects, which were stored to the memory module, to the GPU, wherein the batch command is formulated to cause the GPU to retrieve the set of graphics processing objects from the memory module, to retrieve the subset of graphics processing objects in the set of graphics processing objects from the locations in the array specified by the set of indexes, and to use the set of graphics processing objects to render the batch of graphics primitives in order to generate displayable graphics information.

44. The non-transitory computer-readable medium of claim 43, wherein the instructions that cause the processor to formulate the batch command comprise instructions that cause the processor to compile a graphics processing object when the memory module does not contain one of the identified graphics processing objects; and wherein when the compiled graphics processing object corresponds to the particular type of graphics processing information for the array, the instructions further cause the processor to:

store the compiled graphics processing object in the array, and formulate the batch command to include an index in the set of indexes that indicates a location in the array at which the compiled graphics processing object is stored.

45. The non-transitory computer-readable medium of claim 43, wherein the instructions further cause the processor to compile a graphics processing object when a graphics application is loaded; and wherein the instructions that cause the processor to store graphics processing objects comprises instructions that cause the processor to store the compiled graphics processing object in the memory module.

46. A non-transitory computer-readable medium comprising instructions that, when executed, cause a graphics processing unit (GPU) to:

receive, from a GPU driver executed by a central processing unit, a batch command to render a batch of graphics primitives from a set of graphics processing objects, wherein the batch command includes a base address that identifies a memory location of an array in a memory module and a set of indexes that indicate locations of a subset of the set of graphics processing objects, wherein the subset of graphics processing objects are in the array, wherein the array corresponds to a particular type of graphics processing information, and wherein each of the subset of graphics processing objects corresponds to the particular type of graphics processing information, such that the set of indexes identify the graphics processing objects of the particular type corresponding to the array of the subset that are to be used to render at least some of the batch of graphics primitives, without receiving any of the subset of graphics processing objects in the batch command;

the set of graphics processing objects including the subset of graphics processing objects from the memory module, wherein the instructions to retrieve comprise instructions to retrieve graphics processing objects from the locations of the array identified by the indexes; and process the batch of graphics primitives using the set of graphics processing objects including the subset of graphics processing objects in order to generate displayable graphics information.

47. The non-transitory computer-readable medium of claim 46, wherein the GPU driver compiles a graphics processing object and stores the compiled graphics processing object in the memory module when the GPU driver identifies a graphics processing object that is to be used by the GPU to render the batch of graphics primitives but is not currently stored in the memory module.

48. The non-transitory computer-readable medium of claim 46, wherein the instructions further cause the processor to:

cache one of the retrieved graphics processing objects in a cache within the GPU; and use the indexes in the batch command to retrieve, with the GPU, the graphics processing objects from the cache, wherein the GPU uses the indexes in the batch command to retrieve the graphics processing objects from the memory module when the cache does not include the graphics processing objects.

49. The non-transitory computer-readable medium of claim 46, wherein the instructions that cause the processor to process the batch of graphics primitives comprise instructions that cause the processor to:

provide, with a first pipeline engine in the GPU, a one of the retrieved graphics processing objects to a second pipeline engine in the GPU; and execute, with the second pipeline engine, instructions in the one of the graphics processing objects provided to the second pipeline engine in order to perform a graphics processing operation.

* * * * *